Patented June 3, 1930

1,761,108

UNITED STATES PATENT OFFICE

LOUIS DESMARQUEST, OF NEUILLY-SUR-SEINE, FRANCE

METHOD FOR THE MANUFACTURE OF CELLULAR BUILDING MATERIALS

No Drawing. Application filed April 16, 1929, Serial No. 355,673, and in Great Britain April 18, 1928.

This invention has for its primary object to provide an improved method for the manufacture of cellular building materials from refractory or non-refractory clays and/or chamottes or sand, silica or the like without the use of organic substances adapted to be destroyed in the baking process for giving rise to the required cells, this method involving the novel use of hydraulic cement such as Portland cement or the like in conjunction with a celliferous gas generating effervescent powder such as aluminium powder or a similar metallic powder.

A further object of the invention is to provide a simple, cheap and efficient method for manufacturing refractory and heat insulating cellular building materials possessing the qualities of mechanical resistance of an ordinary baked ceramic product.

The improved method according to the invention essentially comprises the steps of admixing refractory or non-refractory clays and/or chamottes or sand, silica or the like, either baked or non-baked, with hydraulic cement such as Portland cement or the like and a celliferous gas generating powder such as aluminium powder, then adding water and thoroughly intermingling the ingredients of the aqueous slip thus formed, then casting said slip into molds having the required shape and size, then allowing the molded masses to set and contract, demolding and allowing them to dry, and finally baking the molded and dried blocks at a temperature (for example 1300° C.) sufficient for dehydrating the cement and melting or wholly or parly vitrifying the ingredients in the composition body.

According to the invention, the clay is preferably heated prior to being admixed with hydraulic cement such as Portland cement or the like and the celliferous gas generating powder at a temperature (for example 200° C. to 1100° C.) lower than the final baking temperature but sufficient for dehydrating said clay without completely baking it and for lessening its contraction before the treatment, as above stated.

According to the invention, moreover, the preliminarily dehydrated clay is advantageously sieved through a screen having the required mesh or through a foraminous plate so as to lose its plasticity before being admixed with the other ingredients of the body to be submitted to the treatment.

Still according to the invention, the percentage of hydraulic cement added to the clay, preferably dehydrated preliminarily as above stated, varies according to the mechanical resistance, the refractoriness and the specific gravity to be given to the cellular material to be obtained, it being understood that more cement than clay must be admixed if the material has to be very light and little refractory but more clay must be admixed if the material has to be more refractory.

Still according to the invention, a certain percentage (advantageously 10%) of unbaked clay is preferably incorporated to the mixture so that, after being molded, the latter may contract to a certain extent and facilitate demolding.

Still according to the invention, the molds which for example can be made of wood, metal, gypsum or other suitable material are advantageously rendered waterproof by greasing or otherwise before the molding operation, said molds being preferably only filled to half their capacity or two thirds thereof, depending on the composition of the gas generating slip so as to prevent any overflowing.

The improved method may for example comprise the following steps when carried out on an industrial basis:

1. Heat a fire clay of good quality to a temperature of 200° C. to 1100° C. and, after having crushed same for example in a pebble mill, sieve it to a suitable grain size according to the sectional area of the refractory blocks or articles to be molded so as to dehydrate said clay without completely baking it and to deprive it of its plasticity and produce an aggregate body.

2. Add to the clay mass thus dehydrated, rendered non-plastic and aggregated a certain percentage of hydraulic cement such as Portland cement or the like, said percentage varying according to the mechanical resistance, the refractoriness and the specific gravity to be obtained, it being understood that more cement than clay must be admixed if the material has to be light and little refractory and that, on the contrary, more clay must be admixed if the material has to be heavier and more refractory.

3. Add a certain percentage (usually 10%) of unbaked clay so that after being molded the admixture may contract to a certain extent thereby facilitating demolding.

4. Incorporate into the admixture of clay and cement a certain amount of powdered aluminium (or a similar gas generating powder) and add a fairly large quantity of water, and then thoroughly mix the ingredients of the aqueous batch thus formed, for at least three minutes, to form a slip.

5. Cast the slip thus prepared in molds made of wood, metal, gypsum or other suitable substance previously rendered waterproof by greasing or otherwise, care being taken to only fill these molds to half their capacity or to two thirds thereof (depending on the composition of the effervescent slip) to avoid overflowing. The water by reacting upon the several ingredients in the admixture generates gases which by producing bubbles inside the mass swell the latter out, said bubbles being adapted to constitute the cells in the finished material.

6. After the composition body has sufficiently contracted subsequently to the effervescence, demold it, allow it to dry and bake it (for example in a ceramic kiln) at a temperature higher than that mentioned in step No. 1, for instance at a temperature of 1300° C., if said prior temperature was 500° C.

The following example refers to a cellular building material obtained by the aforesaid method, having a specific gravity of 0.9 and, after being baked at 1250° C., a satisfactory thermal resistance and refractoriness:

|  | Parts by weight |
|---|---|
| Cement | 40 |
| Fire clay baked at 400° C. and crushed and ground | 50 |
| Unbaked clay | 10 |
| Powdered aluminium | 0.12 |

By using ordinary or saponified water at a temperature of say 40° C. the celliferous reaction is facilitated.

It should be noted that in the succession of the aforesaid operative steps, it is the hydraulic cement (Portland cement or the like) which, in conjunction with the gas generating powder, permits the formation of the cells whilst imparting to the block or article in the course of manufacture a sufficient mechanical resistance to allow it to be readily demolded and handled before being baked. The baked fire clay or chamotte plays the part of any aggregate mass during the mixing and setting of the slip and subsequently at the end of the baking process it plays the agglomerating part which is inherent to its molecular structure, this agglomerating function of the baked fire clay or chamotte taking place at the very moment when it is very valuable inasmuch as, since the cement has been deprived of its crystallization water, it has a tendency to decay into dust form.

It should also be noted that the use of hydraulic cement in the method according to the invention is only, as it were, a manufacturing trick since the structural properties of such cement which are due to its hydraulic character disappear after the final baking operation according to the invention. As a matter of fact, owing to the cementitious body being baked in ovens or kilns as those commonly used in the ceramic art, the silico-aluminates and the lime contained in Portland cement or the like enter into an intimate combination with the refractory clay or chamotte, fusion or vitrification taking place at least partly, whereby after the baking operation no free lime or no lime capable of being freed is present in the admixture, and the material becomes much harder than if it had set in a cold process, its degree of hardness being substantially equal to that of a ceramic product. In other words, advantage is taken of the hydration of cement for solidifying i. e. conglomerating the batch when still cold while at the same time giving rise to the required cells by means of the gas generating powder which produces bubbles as aforesaid, the final baking operation being adapted to render the material refractory. At the end of this final baking operation, no actual cement is to be found in the block or other article manufactured since all cement has practically been combined with the clays or the chamotte without clinkering.

It will be appreciated that, instead of fire clay, an equivalent substance might be used for the preparation of the slip. Thus for example sand stone that could similarly be baked and further treated as above-described might be used, the materials thus obtained being capable of being enamelled in furnaces by the known processes.

It will also be appreciated that minor operative details of the steps of the above-described method might be changed without departing from the true spirit and scope of the invention.

What I claim is:—

1. A method for manufacturing cellular building materials having a light, heat insulating and highly resistant structure comprising the steps of admixing refractory clay with hydraulic cement and a gas generating powder such as aluminium powder, adding water and thoroughly intermingling the ingredients to form a slip, casting the slip into properly shaped and sized molds, allowing the molded masses to set and contract, demolding and allowing the blocks so molded to dry, and baking the molded and dried blocks at a temperature sufficient for dehydrating the cement and vitrifying the ingredients in the mass.

2. A method for manufacturing cellular building materials having a light, heat insulating and highly resistant structure comprising the steps of admixing chamottes with hydraulic cement such as Portland cement and a gas generating powder such as aluminium powder, adding water and thoroughly intermingling the ingredients to form a slip, casting the slip into properly shaped and sized molds, allowing the molded masses to set and contract, demolding and allowing the blocks so shaped to dry, and baking the molded and dried blocks so formed at a temperature sufficient for dehydrating the cement and vitrifying the ingredients in the mass.

3. A method for manufacturing cellular building materials having a light, heat insulating and highly resistant structure comprising the steps of admixing refractory clay and chamotte with hydraulic cement and a gas generating powder such as aluminium powder, adding water and thoroughly intermingling the ingredients to form a slip, casting the slip into properly shaped and sized molds, allowing the molded masses to set and contract, demolding and allowing the blocks so molded to dry, and baking the molded and dried blocks so shaped at a temperature sufficient for dehydrating the cement and vitrifying the ingredients in the mass.

4. A method for manufacturing cellular building materials having a light, heat insulating and highly resistant structure comprising the steps of admixing clay and silica or the like with hydraulic cement such at Portland cement and a gas generating powder such as aluminium powder, adding water and thoroughly intermingling the ingredients to form a slip, casting the slip into properly shaped and sized molds, allowing the molded masses to set and contract, demolding and allowing the blocks so shaped to dry, and baking the dried blocks so formed at a temperature sufficient for dehydrating the cement and vitrifying the ingredients in the mass.

5. A method for manufacturing cellular building materials having a light, heat insulating and highly resistant structure comprising the steps of heating clay at a temperature sufficient for dehydrating it without baking it and for lessening its contracting power, admixing the clay thus dehydrated with hydraulic cement and a gas generating powder such as aluminium powder, adding water and thoroughly intermingling the ingredients to form a slip, casting the slip into properly shaped and sized molds, allowing the molded masses to set and contract, demolding and allowing the blocks so molded to dry, and baking the molded and dried blocks at a temperature sufficient for dehydrating the cement and vitrifying the ingredients in the mass.

6. A method for manufacturing cellular building materials having a light, heat insulating and highly resistant structure comprising the steps of heating clay at a temperature sufficient for dehydrating it without baking it and for lessening its contracting power, sieving the clay thus dehydrated to deprive it of its plasticity, admixing said clay with hydraulic cement and a gas generating powder such as aluminium powder, adding water and thoroughly intermingling the ingredients to form a slip, casting the slip into properly shaped and sized molds, allowing the molded masses to set and contract, demolding and allowing the blocks so shaped to dry, and baking the molded and dried blocks at a temperature sufficient for dehydrating the cement and vitrifying the ingredients in the mass.

7. A method for manufacturing cellular building materials having a light, heat insulating and highly resistant structure comprising the steps of admixing refractory clay with hydraulic cement and a gas generating powder such as aluminium powder, the proportion of hydraulic cement to the clay being relatively large if the material to be obtained must be light and little refractory and relatively small if said material must be heavy and very refractory, admixing water and thoroughly intermingling the ingredients to form a slip, casting the slip into properly shaped and sized molds, allowing the molded masses to set and contract, demolding and allowing the blocks so molded to dry, and baking the molded and dried blocks at a temperature sufficient for dehydrating the cement and vitrifying the ingredients in the mass.

8. A method for manufacturing cellular building materials having a light, heat insulating and highly resistant structure comprising the steps of heating clay at a temperature sufficient for dehydrating it, sieving the clay, admixing said clay with hydraulic cement and a gas generating powder such as aluminium powder, adding water and thoroughly intermingling the ingredients to form a slip, casting the slip into properly shaped and sized molds that have been rendered waterproof, so as to fill them partly only, allowing the molded masses to set and contract, demolding and allowing the blocks so shaped to dry, and baking the blocks at a temperature sufficient for dehydrating the cement while vitrifying the ingredients in the mass into a hard conglomerated body.

9. A method for manufacturing cellular building materials having a light, heat insulating and highly resistant structure comprising the steps of heating clay at a temperature sufficient for dehydrating it, sieving the clay, admixing the clay with hydraulic cement and a gas generating powder such as aluminium powder, the proportion of cement to the clay being relatively large if the material to be obtained must be light and little refractory and relatively small if said material must be heavy and very refractory, adding water and thoroughly intermingling the ingredients to form a slip, casting the slip into properly shaped and sized molds, allowing the molded masses to set and contract, demolding and allowing the blocks thus shaped to dry, and baking the blocks at a temperature sufficient for dehydrating the cement while vitrifying the ingredients in the mass into a hard conglomerated body.

10. A method for manufacturing cellular building materials having a light, heat insulating and highly resistant structure comprising the steps of admixing chamottes with hydraulic cement, a gas generating powder such as aluminium powder and a relatively small percentage of unbaked clay, adding water and thoroughly intermingling the ingredients to form a slip, casting said slip into molds to fill them up partly, allowing the molded masses to set and contract, demolding and allowing the blocks so shaped to dry, and baking the molded and dried blocks at a temperature sufficient for dehydrating the cement while vitrifying the ingredients in the mass into a hard conglomerated body.

11. A method for manufacturing cellular building materials having a light, heat insulating and highly resistant structure comprising the steps of admixing chamotte with hydraulic cement, a gas generating powder such as aluminium powder and roughly ten percent of unbaked clay, adding water and thoroughly intermingling the ingredients to form a slip, casting said slip into shaping molds that have been rendered waterproof by greasing, to fill them partly, allowing the molded masses to set and contract, demolding and allowing the blocks so shaped to dry, and baking the blocks at a temperature, for example 1300° C., sufficient for dehydrating the cement while vitrifying the ingredients in the mass into a hard conglomerated refractory body.

12. A method for manufacturing cellular refractory building materials comprising the steps of heating clay at a temperature from 200° C. to 1100° C. for dehydrating it without baking it and for lessening its contracting power, sieving said clay for depriving it of its plasticity, admixing said clay with hydraulic cement such as Portland cement and a gas generating powder such as aluminium powder, adding water and thoroughly intermingling the ingredients of the fluid aqueous batch thus formed to make a slip, casting said slip into shaping and waterproof molds to fill them partly, allowing the molded masses to set and contract, demolding and allowing the blocks so shaped to dry, and baking the molded and dried blocks at a temperature higher than the first-named temperature, for example 1300° C., for dehydrating the cement and vitrifying the ingredients in the mass into a hard conglomerated refractory body.

13. A method for manufacturing cellular refractory building materials having a light, heat insulating and highly resistant structure comprising the steps of heating fire clay at a temperature of 400° C., crushing and sieving said clay, admixing fifty parts by weight of said clay with forty parts of hydraulic cement such as Portland cement, ten parts of unbaked clay and 0.12 parts of powdered aluminium, adding a sufficient quantity of water to form a fluid aqueous batch and thoroughly intermingling the ingredients of the batch to form a slip, casting said slip into properly shaped and sized molds that have previously been rendered waterproof by greasing their walls, the slip being poured into the molds to fill them partly only, allowing the molded masses to set and contract, demolding and allowing the blocks so shaped to dry, and baking the blocks so shaped in a ceramic oven at a temperature of 1250° C. for dehydrating the cement and vitrifying the ingredients in the mass into a hard conglomerated refractory body.

In testimony whereof I affix my signature.

LOUIS DESMARQUEST.